United States Patent [19]

Klemens

[11] Patent Number: 4,848,390
[45] Date of Patent: Jul. 18, 1989

[54] SWITCHING VALVE HAVING HYDRAULIC SELF-HOLDING PROPERTIES

[75] Inventor: Harald Klemens, Munich, Fed. Rep. of Germany

[73] Assignee: Heilmeier & Weinlein Fabrik Fur Oel-Hydraulik GmbH & Co. KG, Fed. Rep. of Germany

[21] Appl. No.: 240,823

[22] Filed: Sep. 6, 1988

[30] Foreign Application Priority Data

Sep. 7, 1987 [DE] Fed. Rep. of Germany ....... 3729961

[51] Int. Cl.$^4$ ............................................ F15B 13/042
[52] U.S. Cl. ...................................... 137/116; 137/115
[58] Field of Search ................................ 137/115, 116

[56] References Cited

U.S. PATENT DOCUMENTS

| 4,270,562 | 6/1981 | Oberth et al. | 137/115 |
| 4,545,401 | 10/1985 | Kardis | |
| 4,676,273 | 6/1987 | Stoltman | 137/625.61 |

FOREIGN PATENT DOCUMENTS 1254925 11/1967 Fed. Rep. of Germany.
1498280 11/1968 Fed. Rep. of Germany.
2133936 11/1972 Fed. Rep. of Germany.
3433535 7/1986 Fed. Rep. of Germany.

OTHER PUBLICATIONS

Hydraulics and Pneumatics Magazine, Apr. 1961, p. 75.

*Primary Examiner*—Gerald A. Michalsky
*Attorney, Agent, or Firm*—Kinzer, Plyer, Dorn, McEachran & Jambor

[57] ABSTRACT

Switching valve (1') with hydraulic self-holding properties, in which a step piston (11') having a closure piston element (15) connects or locks a pressure inlet (16') and a pressure outlet (17'), in which a pressure line (18, 19) leading to the pressure inlet (16') and continued to a consuming point (A), and a duct (21) leading from the pressure line to a control chamber (10) of a control piston element (12), are provided; and in which an overflow connection and a relief duct (34), openable as a function of the stroke from the annular chamber (25), are provided between the pressure inlet (16') and the annular chamber (25). The overflow connection is formed by a continuously open duct (32'), whose passage cross-section is smaller than the passage cross-section of the relief duct (34).

7 Claims, 2 Drawing Sheets

SWITCHING VALVE HAVING HYDRAULIC SELF-HOLDING PROPERTIES

The invention relates to a switching valve of the type having selfholding properties.

In a switching valve of this type known from the DE-PS 34 33 535 the overflow connections from the pressure inlet to the annular chamber are formed by flow pockets formed in the piston elements, which increasingly open the connection to the annular chamber as a function of the stroke of the step piston as soon as the closure piston element is displaced in locking direction. Conversely, the flow pockets lock the connection as soon as the closure piston element is displaced to the passage position or in leading or retarded fashion to this. The flow pockets cooperate for this purpose with a control edge in the annular chamber. The cooperation of the outlet of the relief duct with the control edge in the end of the first section of the step bore is coordinated with the cooperation of the flow pockets with the control edge in such fashion that the relief duct is openable at the same time or retardedly to the connection of the pressure inlet to the annular chamber. The exact coordination of flow pockets and their control edge on the one hand and the outlet of the relief duct and its control edge on the other hand, which is necessary for this, causes problems in terms of manufacturing technology. Already small manufacturing inaccuracies impair the necessary vigorous switching pulse of the switching valve. It is practically almost impossible to eliminate such manufacturing inaccuracies subsequently in view of an unobjectionable switching behaviour of the switching valve. It requires an extraordinarily high expenditure to increase the manufacturing precision that much that the manufacturing inaccurcies can not cause this disadvantage.

A flow control valve is known from the DE-OS 14 98 280 in which an annular surface of the step piston is acted upon from the pressure inlet via a continuously open duct in order to produce an additional force at the step piston in one switching direction. The pressure medium acting upon the annular surface cannot flow off quickly enough in the counter-switching direction of the step piston so that here a delayed and slow switching movement occurs which is not admissible for a switching valve of the type mentioned at the beginning.

The same applies to a relief valve known from the Journal Hydraulics and Pneumatics, April 1961, page 75, FIG. 18, in which an annular surface of the step piston is acted upon by a control pressure derived from the pressure inlet to produce an additional force at the step piston in one switching direction. In the opposite switching direction of the step piston the annular chamber can however not be relived sufficiently quickly so that here no vigorous switching pulse can be achieved and this valve cannot be used as a switching valve of the type mentioned at the beginning.

A two-step pressure control valve is known from the DE-AS 12 54 925, in which an overflow connection from the pressure inlet to an annular chamber is provided to achieve a vigorous opening stroke with a large conveying amount at the pressure inlet and to keep the no-load pressure low, in which a throttling point is disposed. This overflow duct is however not continously open, but is opened as a function of the stroke position of the step piston. Thus a very slow switching movement ensues in the other switching direction of the step piston, because the annular chamber can only be pressure-relieved slowly so that also this valve cannot be used as a switching valve of the type mentioned at the beginning.

The set problem is solved according to the invention by the features indicated in the characterizing part of claim 1.

Under the present invention the very toilsome coordination of the opening and the locking of the overflow connection from pressure inlet to annular chamber is omitted in the aforementioned known switching valve, because the overflow connection is a continuously open duct. This causes considerable advantages in terms of manufacturing technology, because the coordination of the opening of the relief duct with the stroke of the step piston alone can be carried out very easily in terms of manufacturing technology. The precision which is to be used in the manufacture of the switching valve or the manufacture of its individual components is within the framework of that what is customary. If due to a manufacturing inaccuracy the switching behaviour of the switching valve is to be impaired, this can be eliminated easily also subsequently by the single coordination of the opening of the relief duct. The annular chamber is continuously under the pressure at the pressure inlet. Since, however, the passage cross-section of the duct to the annular chamber is smaller than the passage cross-section of the relief duct, the annular chamber is immediately pressure-relieved as soon as the relief duct is opened, whereby the vigorous switching pulse of the step piston occurs. In the counter-direction the pressure in the annular chamber acts in the same direction as the spring acting upon the closure piston element with the relief duct being locked so that these two forces are capable of overcoming the counter-pressure in the control chamber of the control piston element abruptly which leads to a vigorous switching movement also in this switching direction.

Under one embodiment the duct with the desired cross-section can already be provided without problems in the manufacturing of the housing.

As an alternative to this another embodiment is suitable, because the manufacture of the housing is simplified by means of the cylindrical sleeve which can be processed with precision.

A further alternative embodiment is possible. Thus, since the differential piston is anyhow processed very carefully, it does not cause any problems to move the duct already into the piston element right from the beginning.

Another embodiment is furthermore of importance, wherein the stroke-dependent opening or closing of the relief duct is achieved such that a rapid pressure relief is ensured for the pressure medium from the annular chamber.

Another embodiment is advantageous in terms of manufacturing technology, in that a continuous enlargement can be easily provided in the housing design or in the production of the cylindrical sleeve.

According to another embodiment, by having the non-return valve in the pressure line this prevents the possibility that with decreasing pressure at the pressure inlet the system pressure on the consumer sides decreases to an inadmissible extent.

The switching valve is especially suited for the supply of a hydraulic consumer circuit from a pressure source, a pressure varying between an upper and a lower pressure limit having to be imperatively observed in the consumer circuit and pressure variations taking place relatively slowly in the consumer circuit. These slow pressure variations are critical inasmuch as the switching valve intended for supplying the consumer circuit has the tendency in the case of a very slow pressure drop or pressure increase in the consumer circuit of "creeping up on" a switching condition which is undefined and in which the pressure medium coming from the pressure source is throttled to a great extent and heated and mechanically loaded thereby.

Embodiments of the subject matter of the invention are explained by means of the drawing.

Figure 1:
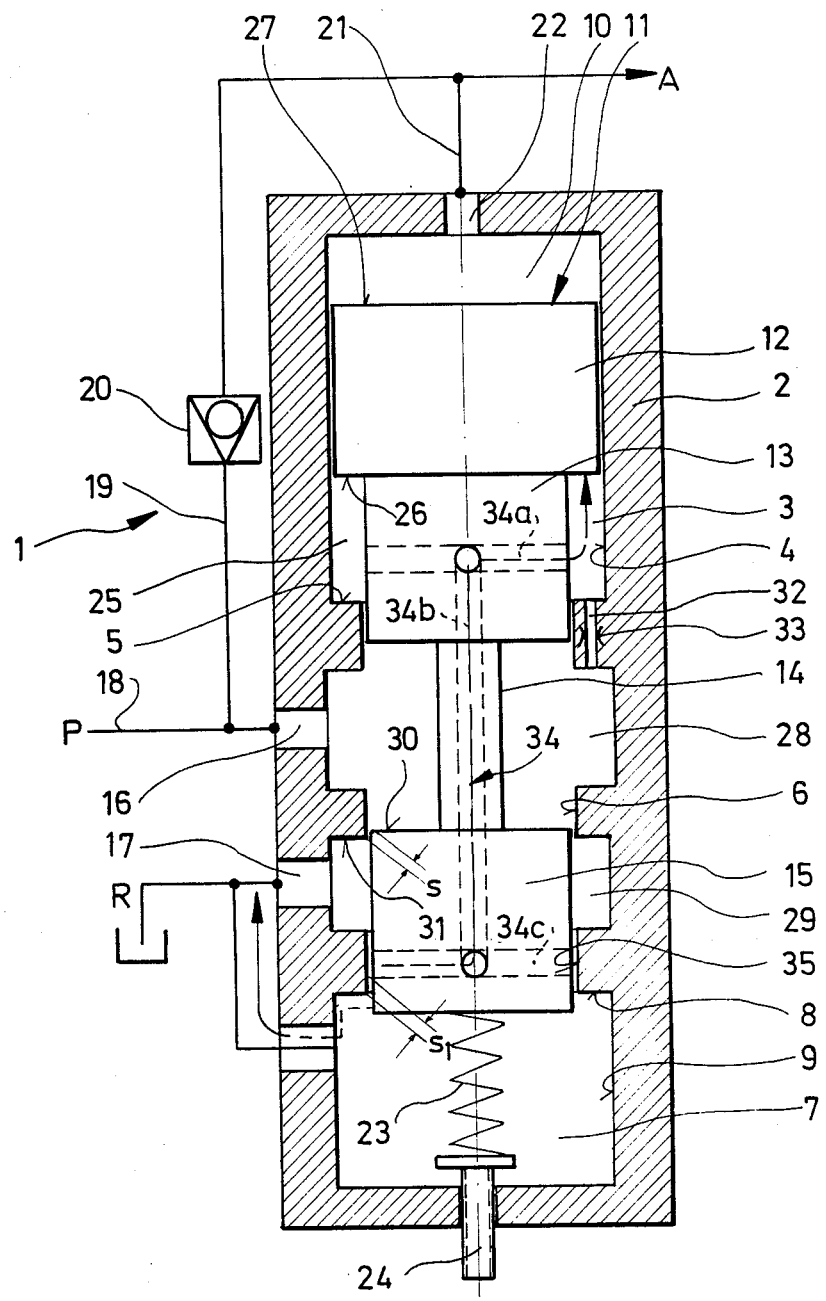
FIG. 1 shows a longitudinal section through a schematic embodiment of a switching valve.

A switching valve 1 according to FIG. 1 has a housing 2 with a longitudinal step through-bore 3. The step bore has a large-diameter second section 4, which passes over to a small-diameter first section 6 via an annular shoulder 5. The small-diameter first section 6 is provided at its end 7 not facing the second section 4 with an enlargement 9 via an annular shoulder 8 in this embodiment.

A control chamber 10 is provided at the opposite end of the second section 4. A step piston 11 is displaceable in the step bore 3, which has a large-diameter control piston element 12 in the control chamber 10, which is adjoined by a piston element 13 reaching into the first section 4 and being continued with smaller diameter. An annular groove is provided between the piston element 13 and the closure piston element 15 which projects into the end of the step bore 3. The step piston is guided in reciprocatable fashion in the step bore 3. A pressure inlet 16 and a radial pressure outlet 17 being axially staggered with respect to it open in the first section 6. Continuous enlargements 28 and 29 in the bore wall are allocated to the pressure inlet 16 and the pressure outlet 17. A pressure line 18 leads to the pressure inlet 16, which is e.g. connected to a pump P. A pressure line 19 to a consuming point A branches off from this pressure line 18, a nonreturn valve 20 locking towards the pressure inlet 16 being disposed in the pressure line 19. A control duct 21 leads from the pressure line 19 to an inlet 22 to the control chamber 10 downstream in the flow direction of the nonreturn valve 20.

A spring 23 is located in the end of the first section 6 of the step bore 3, which acts on the closure piston element 15 in one direction, in which it locks the connection from the pressure inlet 16 to the pressure outlet 17 in the enlargement 29 by cooperation of its front end 30 with a control edge 2. The spring can be adjusted in its bias by means of an adjusting device 24. The control piston element 12 defines an annular chamber 25 with the piston element 13 in the second section 4, in which the control piston element 12 is be pressurized at an annular surface 26. The opposite front surface 27 of the control piston element 12 is acted upon by the pressure in the control chamber 10.

The part of the first section 6 of the step bore 3 located between the piston element 13 and the closure piston element 15 is in a continuous pressure-transmitting connection with the annular chamber 25 via a duct 32. A throttling point 33 being preferably adjustable is possibly provided in the duct 32.

In this embodiment of relief duct 34 leads from the annular chamber 25 to the end 7 of the first section 6, which is openable as a function of the stroke position of the step piston 11. The relief duct 34 has a passage cross-section which is larger than the passage cross-section of the duct 32 or the throttling point 33. The relief duct 34 consists in particular of radial branch bores 34c from the outer circumference of the piston element 13 to a central longitudinal bore 34b and of radial branch bores 34c in the closure piston element 15. The branch bores 34 have their openings 35 in the circumferential surface of the closure piston element 15, the openings 35 being spaced from the front side of the closure piston element 15 located in the end 7 that much that the distance s1 between the control edge 8 and the openings 35 corresponds approximately to the measure S between the control edges or control surfaces 31 and 30. This means that in the case of a downward movement of the step piston in FIG. 1, i.e. in the direction towards the passage position, the openings 35 are open towards the end 7 if the control surface 30 of the closure piston element 15 has passed the control edge 31 and opens the connection from the pressure inlet to the pressure outlet 17. Then the annular chamber 25 is abruptly pressure-relieved because the passage cross-section of the relief duct 34 is larger than the passage cross-section of the duct 32. The end 7 of the first section is connected to a reservoir R or the pressure outlet 17 either directly or via a bypass duct.

The switching valve 1 works as follow:

In pressureless condition the spring 23 keeps the step piston at the top so that the closure piston element 15 adopts its locking position. The pressure inlet 16 is separated from the pressure outlet 17. As soon as the pressure line 18 is acted upon by pressure, the nonreturn valve 20 is opened and the pressure between the piston element 13 and the closure piston element 15 increases. The pressure being built up in the pressure line 19 acts also on the front surface 27 of the closure piston element 12 in the control chamber 10 via the duct 21. At the same time a pressure is built up in the annular chamber 25 via the duct 32. The relief duct 34 is locked. By the selection of the difference in size between the front surface 27 and the annular surface 26 and the force of the spring 23 an upper pressure limit for the consuming point A is determined at which the force on the front surface 27 exceeds the forces on the annular surface 26 and the spring 23 and displaces the step piston 11 downwardly. As soon as the openings 35 pass the control edge 8 the annular chamber 25 is abruptly pressure-relieved. The pressure on the front surface 27 then displaces the step piston 11 abruptly downwardly until a relatively unthrottled flow connection is free between the pressure inlet 16 and the pressure outlet 17. Due to the pressure in the pressure line 19 which decreases then rapidly, the nonreturn valve 20 is closed and maintains the pressure at the consuming point also with a very small pressure at the pressure inlet 16.

If the pressure in the consumer circuit drops to a lower pressure limit which is again determined by the ratio of sizes between the front surface 27 and the annular surface 26 and the force of the spring 23, then the pressure on the annular surface 26 displaces the step piston 11 upwardly jointly with the force of the spring 23 until the control edges 30, 31 pass each other and separate the pressure inlet 16 from the pressure outlet 17. At the same time or almost at the same time the openings 35 are closed upon passing the control edge 8 so that a pressure is built up in the annular chamber 25 which supports the force of the spring 23 and closes the step piston 11 abruptly at least that much towards the top that a positive overlapping occurs between the control edges or control surfaces 30, 31. Then the pressure to the consuming point is again raised up to the aforementioned upper pressure limit via the opening nonreturn valve 20 before the step piston 11 moves again downwardly and locks the nonreturn valve 20.

Also in the case of an extremely slow approach of the upper or lower pressure limit of the consumer pressure an abrupt movement of the step piston 11 results so that instable switching positions of the step piston 11 are reliably avoided.

Figure 2:
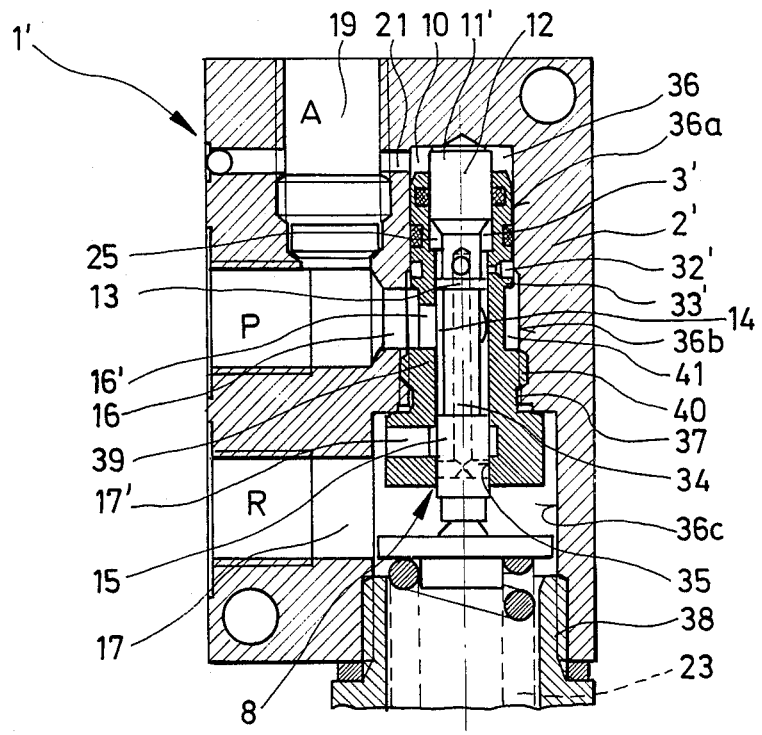
FIG. 2 shows a longitudinal section through a part of a further embodiment.

In the embodiment of FIG. 2 which basically corresponds to FIG. 1 a step bore 36 with a first section 36b, a second, small-diameter section 36a and an enlargement 36c is provided in the housing 2', into which a cylindrical sleeve 39 with a thread is screwed in a threaded section 37. A spring housing 38 is screwed into the lower end of the step bore 36 which receives the spring 23. The actual step bore 3' receiving the step piston 11' is formed in the cylindrical sleeve 39, which is however open towards above and below so that the control piston element 12 projects upwardly and the closure piston element 15 projects downwardly.

A pressure inlet 16' leads from the pressure inlet 16 in the housing 2' to the annular chamber in the area of the annular groove 14 between the piston element 13 and the closure piston element 15. A pressure outlet 17' to the step bore 3' is provided in the lower end of the cylindrical sleeve 39, which is connected to the pressure outlet 17 of the housing 2'. The control edge 8 for the openings 35 of the relief duct 34 are formed at the lower front side of the cylindrical sleeve 39. The section 36b of the step bore 36 forms an annular space 41 which is connected to the pressure inlet 16. The continuously open duct 32' leads from the annular space 41 to the annular chamber 25. A throttling point 33' is disposed in the duct 32' in such fashion that the passage cross-section through the duct 32' is smaller than the passage cross-section through the relief duct 34. The piston element 13 is designed here as a collar being narrow in the longitudinal direction of the step piston 11'. The cylindrical sleeve 29 is sealed in customary fashion in the step bore 36 so that the control chamber 10 is sealed from the annular space 41.

The switching valve 1' according to FIG. 2 works like the switching valve 1 of FIG. 1.

Figure 3:
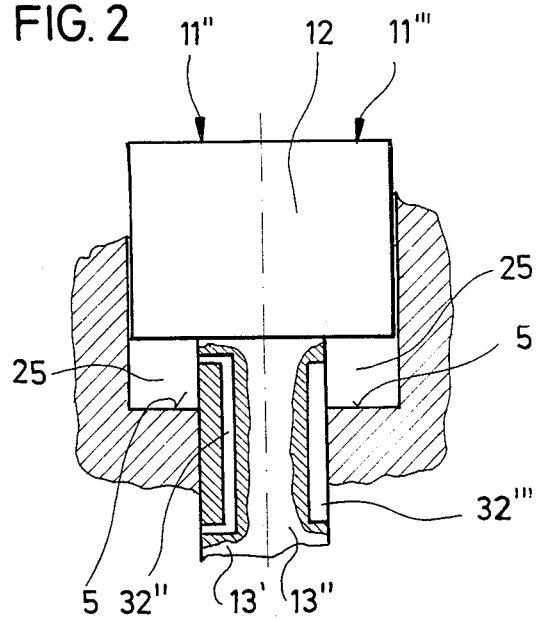
FIG. 3 shows a detail longitudinal section through a two embodiment variants and FIG. 4 shows a detail longitudinal section through a further embodiment variant.

A detail variant is represented in the left half of FIG. 3 in which the step piston 11" (cf. also FIG. 1) is designed in such fashion with respect to the piston element 13' that the continuously open duct 32" extends in the interior of the piston element 13' and is designed in such a length that the connection to the annular chamber 25 is continuously open.

Figure 4:
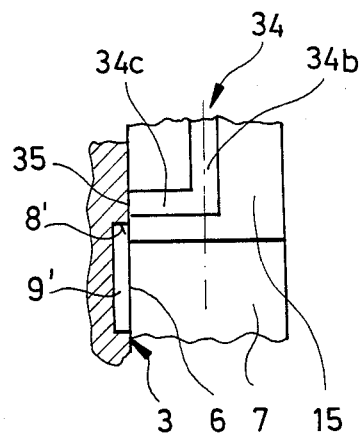

The duct 32'" is designed as a longitudinal groove in the outer circumference of the piston element 13" of the step piston 11'" in the right half of FIG. 3 to connect the annular chamber 25 continuously with the pressure inlet (not shown). It would be conceivable to provide here several longitudinal grooves of small cross-section distributed in circumferential direction which form in their entirety the duct 32". The relief duct 34 is not shown in FIG. 3. According to FIG. 4 the step bore 3 is designed in its first section 6 with a constant diameter. The control edge 8' necessary for opening the opening 35 of the relief duct 34 is formed by a longitudinal recess 9' in the wall of the first section 6 of the step bore 3 which is open towards the end 7 of the first section 6.

I claim:

1. A switching valve (1, 1') with hydraulic self-holding properties comprising a housing step bore (3, 3') containing a step piston (11, 11', 11", 11'"), which is part of a flow path from a pressure inlet (16, 16') to a pressure outlet (17, 17') in its reduced-diameter first section (6) and receives a control piston element (12) of the step piston in its large-diameter second section (4), which projects with a stepped piston element (13, 13', 13") into the first section (6) and defines an intervening annular chamber (25), a closure piston element (15) connected to the piston element (13, 13', 13") which can be reciprocated between a closure position in which it separates the pressure inlet from the pressure outlet and a relief position in which the pressure inlet is connected to the pressure outlet, a spring (23) in a pressure-relieved end (7) of the first section (6) which acts upon the closure piston element (15) in closure direction, a pressure line (18, 19) leading to a pressure inlet (16, 16') and continued to a consuming point (A), a duct (21) leading from the pressure line to a control chamber (10) for the control piston element (12), an overflow connection from the pressure inlet (16, 16') to the annular chamber (25) and a relief duct (34) openable as a function of the stroke of the step piston from the annular chamber (25), characterized in that the overflow connection is a duct (32, 32', 32", 32'") continuously communicating said first section (6) with the annular chamber (25) in both the closure position and relief position of said piston element, and the passage cross-section of said overflow connection duct being smaller than the passage cross-section of the relief duct (34).

2. A switching valve according to claim 1, characterized in that the duct (32) is disposed in the housing (2).

3. A switching valve according to claim 1, characterized in that the step bore (3') is disposed in a cylindrical sleeve (39) fixed in the housing (2'), that the duct (32') leads from an annular space (41) defined at the outer side of the cylindrical sleeve (39) in the housing (2') through the wall of the cylindrical sleeve to the annular chamber (25) and that the annular chamber (41) is connected to the pressure inlet (16).

4. A switching valve according to claim 1, characterized in that the duct (32", 32'") is disposed in the piston element (13', 13").

5. A switching valve according to claim 4, characterized in that the relief duct (34) is guided starting from the outer circumference of the piston element (13) in the interior of the step piston (11) as far as into the closure piston element (15) and opens at its outer circumference and that in the pressure-relieved end (7) of the first section (6) of the step bore (3) a recess (9, 9') forming a control edge (8) for the opening (35) of the relief duct (34) is provided.

6. A switching valve according to claim 5, characterized in that the recess (9) is a continuous enlargement in the first section (6).

7. A switching valve according to claim 6, characterized in that a nonreturn valve (20) locking with respect to the pressure inlet (16) is disposed in the pressure line (18, 19) between the pressure inlet (16) and the duct (21).

* * * * *